Figure 1:
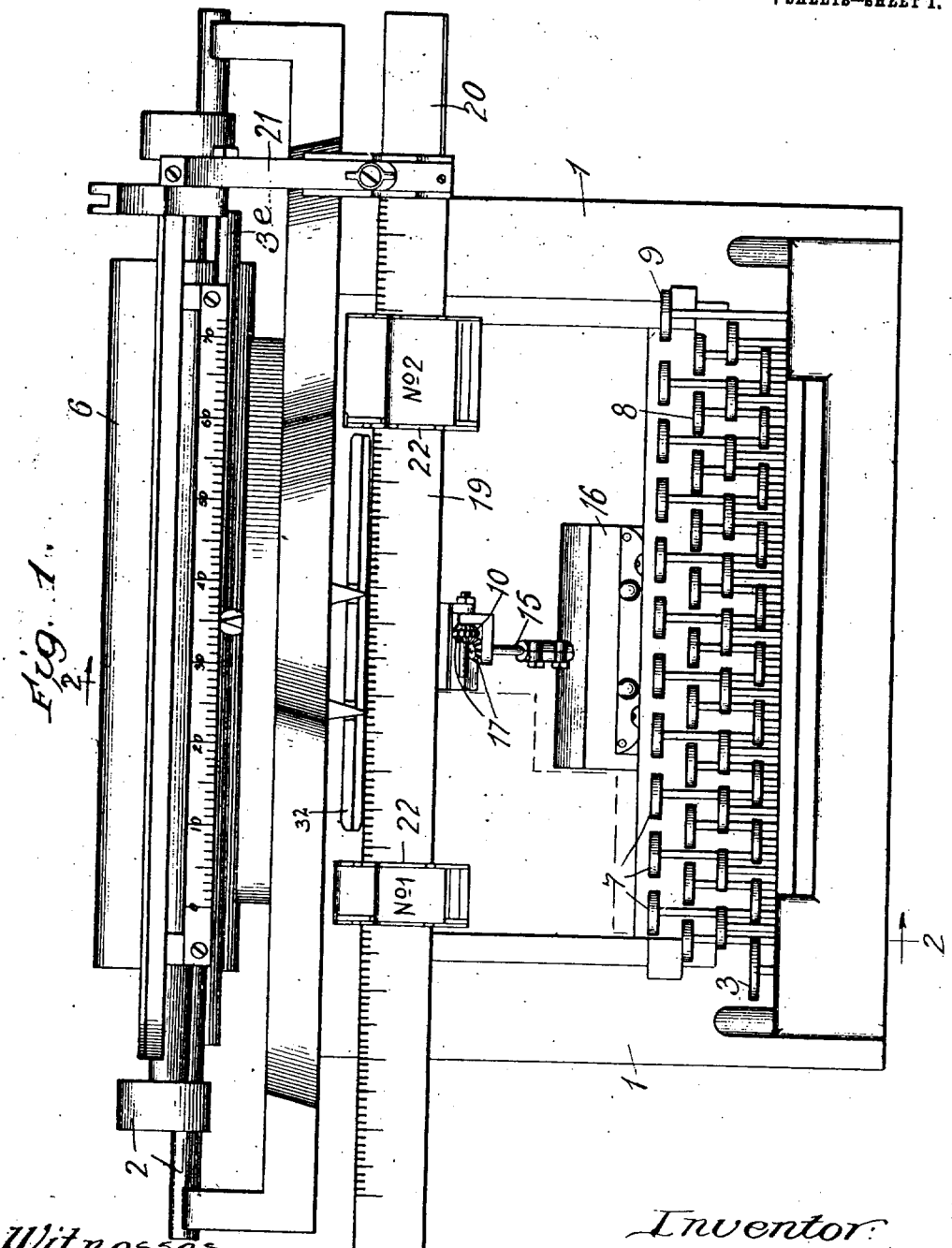

No. 893,720. PATENTED JULY 21, 1908.
H. E. GOLDBERG.
CALCULATING MACHINE.
APPLICATION FILED OCT. 11, 1905.

7 SHEETS—SHEET 1.

Witnesses
Harry R. L. White
Ray White

Inventor:
Hyman Eli Goldberg
By Cheever & Cox
Attys

No. 893,720. PATENTED JULY 21, 1908.
H. E. GOLDBERG.
CALCULATING MACHINE.
APPLICATION FILED OCT. 16, 1905.

7 SHEETS—SHEET 2.

Witnesses:
Harry R. L. White
Ray White

Inventor
Hyman E.␣ Goldberg
By Cheever & Cox
Attys

No. 893,720. PATENTED JULY 21, 1908
H. E. GOLDBERG.
CALCULATING MACHINE.
APPLICATION FILED OCT. 16, 1905.
7 SHEETS—SHEET 4.
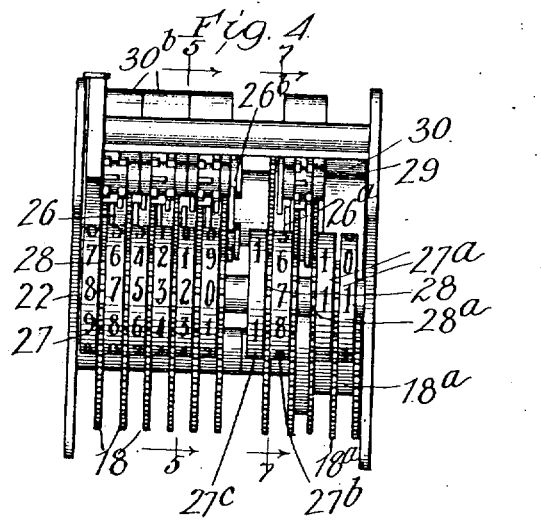
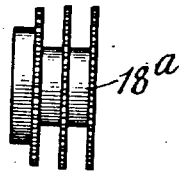
Fig. 4. Fig. 9.
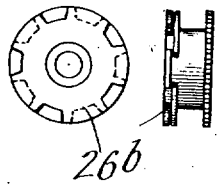 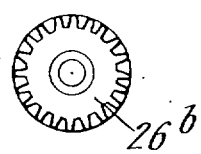 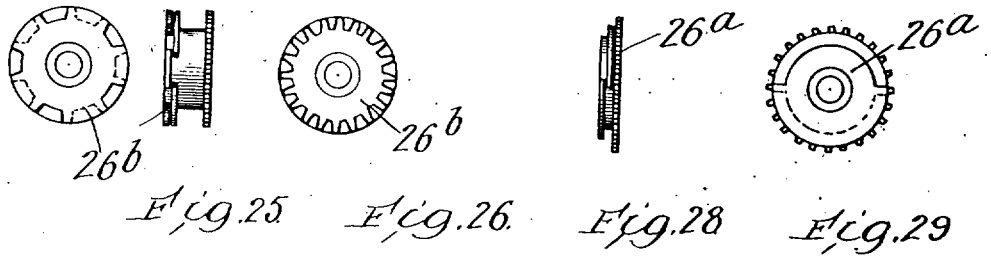 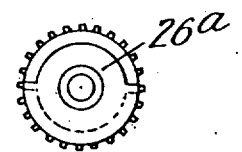
Fig.16 Fig.14 Fig.15 Fig.17 Fig.18
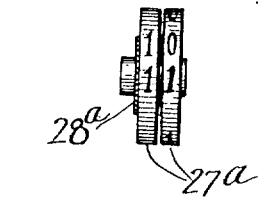 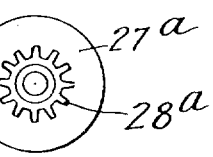 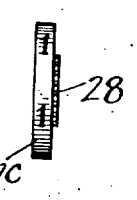 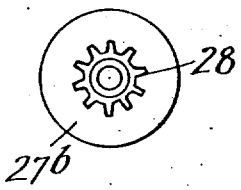
Fig.25 Fig.26 Fig.28 Fig.29
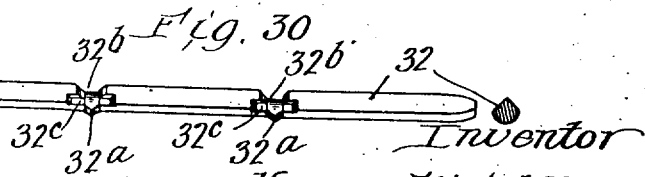
Fig. 30
Witnesses
Harry R. L. White
Ray White
Inventor
Hyman E. L. Goldberg.
By Cheever & Cox
Attys No. 893,720. PATENTED JULY 21, 1908.
H. E. GOLDBERG.
CALCULATING MACHINE.
APPLICATION FILED OCT. 16, 1905.
7 SHEETS—SHEET 5.
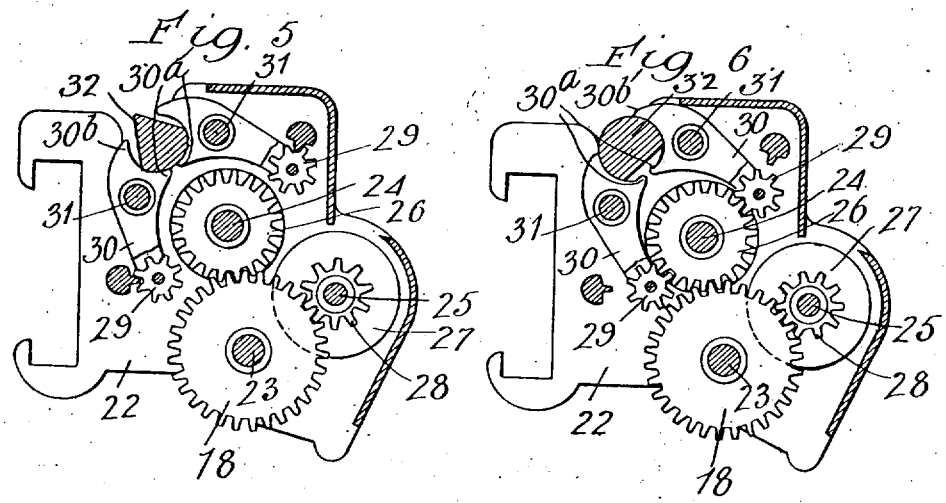
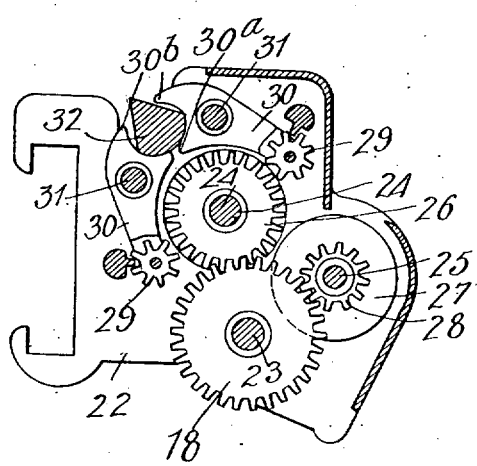
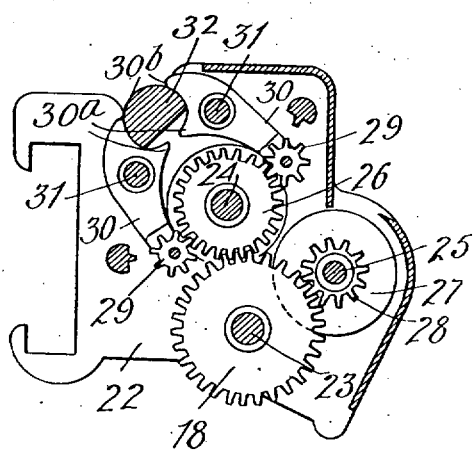
Witnesses
Harry R. L. White
Ray White
Inventor:
Hyman E. Li. Goldberg,
By Cheever & Cox
Attys No. 893,720. PATENTED JULY 21, 1908.
H. E. GOLDBERG.
CALCULATING MACHINE.
APPLICATION FILED OCT. 16, 1905.
7 SHEETS—SHEET 6.
Fig. 10
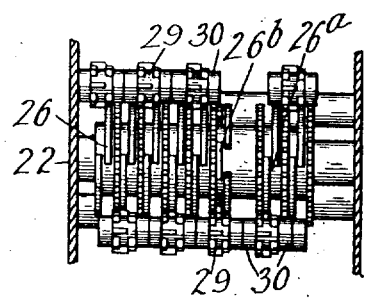
Fig. 13  Fig. 11.  Fig. 12
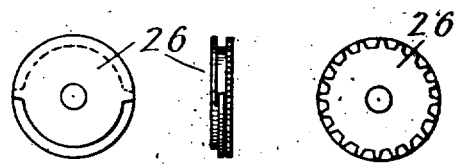
Fig. 19.
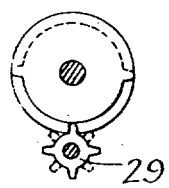
Fig. 24
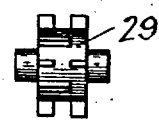
Fig. 23  Fig. 21  Fig. 22  Fig. 20  Fig. 27.
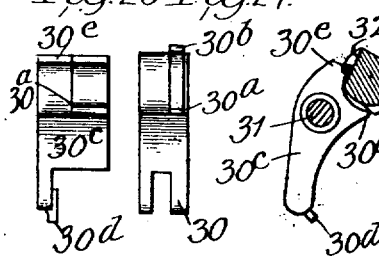
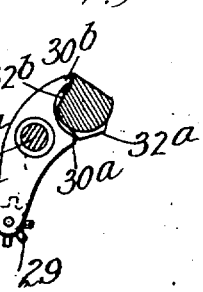
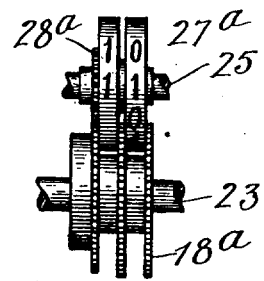
Witnesses
Harry R. L. White
Ray White
Inventor
Hyman Eli Goldberg,
by Cheever Cox
Attys.

No. 893,720. PATENTED JULY 21, 1908.
H. E. GOLDBERG.
CALCULATING MACHINE.
APPLICATION FILED OCT. 16, 1905.
7 SHEETS—SHEET 7.
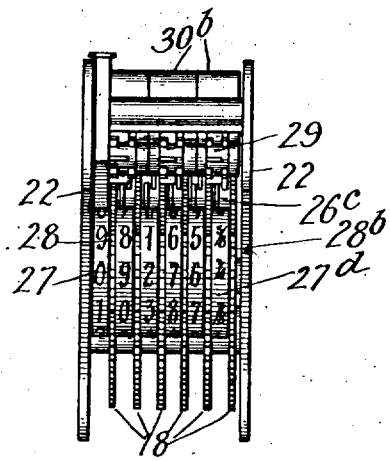
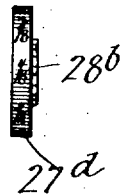
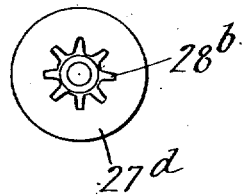
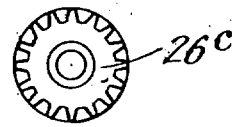
Witnesses:
Harry R. L. White.
Ray White.
Inventor:
Hyman E. Li. Goldberg,
By Cheever Cox

UNITED STATES PATENT OFFICE

HYMAN ELI GOLDBERG, OF CHICAGO, ILLINOIS, ASSIGNOR TO GOLDBERG CALCULATING MACHINE COMPANY, A CORPORATION OF ILLINOIS.

CALCULATING-MACHINE.

No. 893,720.  Specification of Letters Patent.  Patented July 21, 1908.

Application filed October 16, 1905. Serial No. 282,963.

*To all whom it may concern:*

Be it known that I, HYMAN ELI GOLDBERG, a citizen of the United States, residing at Chicago, in the county of Cook and State of Illinois, have invented a certain new and useful Improvement in Calculating - Machines, of which the following is a specification.

My invention relates to calculating machines, including calculating attachments to typewriters, the latter being the form here illustrated.

In commercial bills of accounts, frequently there are columns of figures of more than one denomination; thus there may be columns containing integers and fractions, or feet and inches, or hours and minutes, or dollars and cents, or pounds, shillings and pence. An English wholesale cloth merchant might have a bill like the following:

| | | | |
|---|---|---|---|
| 40¼ yds. serge | | | |
| 51⅞ " " | | | |
| 91½ yds. | £27 | 9s. | 6d. |
| 28⅞ yds. cheviot | | | |
| 23¼ " " | | | |
| 51½ yds. | £25 | 15s. | 6d. |
| | £53 | 5s. | 0d. |

In this bill there are whole numbers where, in adding, the carrying is to occur for every ten; vulgar fractions where the carrying is to occur for every eight; pence where the carrying is to occur for every twelve; and shillings where the carrying is to occur for every twenty. By vulgar fractions I mean those expressed by two numbers, a numerator and a denominator, the denominator being either greater or less than 10.

The object of this invention is to provide mechanism adapted to calculate accounts containing such columns of more than one denomination, and in calculating to be operated in the same way as though the columns were all of one denomination.

The invention consists in improvements in totalizing mechanisms, the form of totalizer here shown being in many respects identical with the one for which Letters Patent of the United States were granted me October 20, 1903 No. 741,961. The invention also consists in certain improvements in key actions and the relationship thereof to the totalizer.

In many respects the key action here shown is identical with the one for which Letters Patent No. 782,554 were granted to me February 14, 1905.

In carrying out my invention, I have constructed a totalizer having more than one kind of carrying wheels therein, for example wheels that produce a carrying effect for every eighth unit and also, in the same totalizer, wheels that produce a carrying effect for every tenth unit, both kinds of wheels being operated from the same set of keys without requiring the assistance or mediation of any shift keys or similar devices. For various reasons it is desirable in a totalizer that all of the receiving wheels, which are those operated from the setting wheel, outside of the totalizer, should be of the same size and one of the objects of this invention is to render this possible. It is desirable in a calculating machine to employ as few figure keys as possible, and in a machine for calculating English money where there are twenty shillings in a pound it would be undesirable to employ nineteen or twenty keys. I produce the proper action by means of only eleven keys including the "0" key which latter produces no rotative effect upon the carrying wheels. In accomplishing this I provide a single special key which is so constructed and connected that it will print a "1" but add ten; and the "1" will appear on the printed page in the tens pence place, that is, at the left of the two digits indicating the number of pence.

It is also an object of this invention to provide means whereby it is possible not only to calculate fractions but also to print them from the same set of keys which print the integers.

Figure 2:
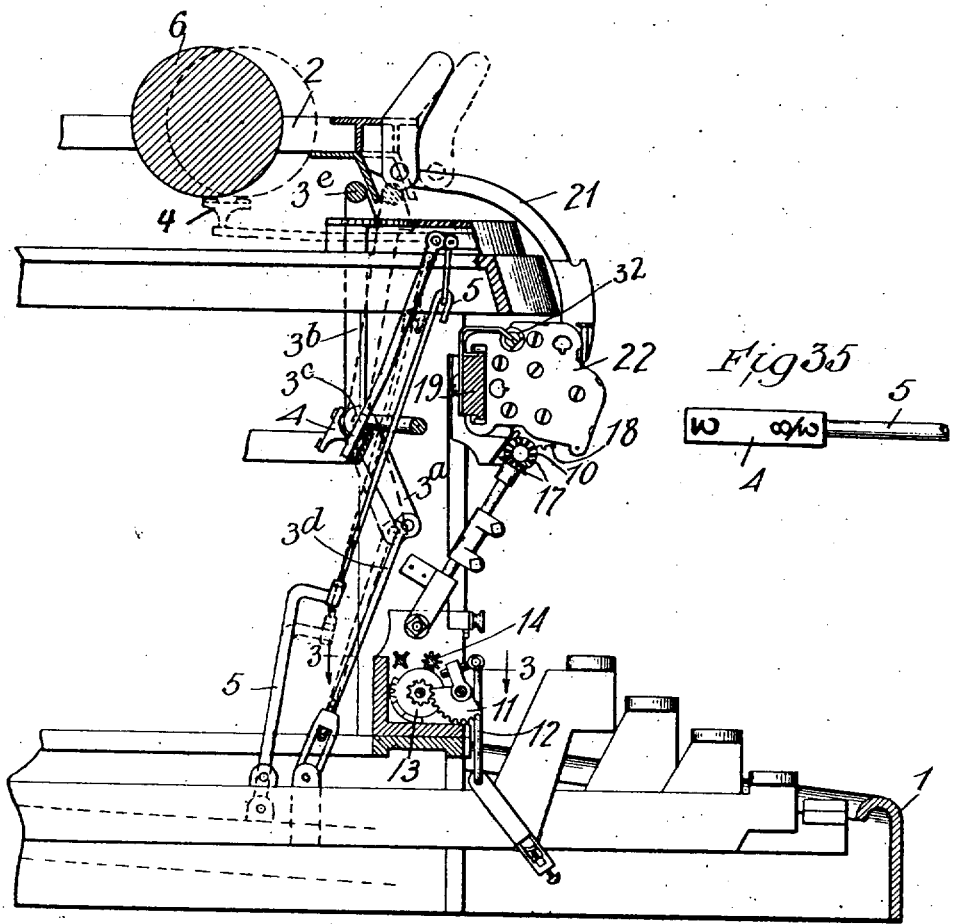
Figure 3:
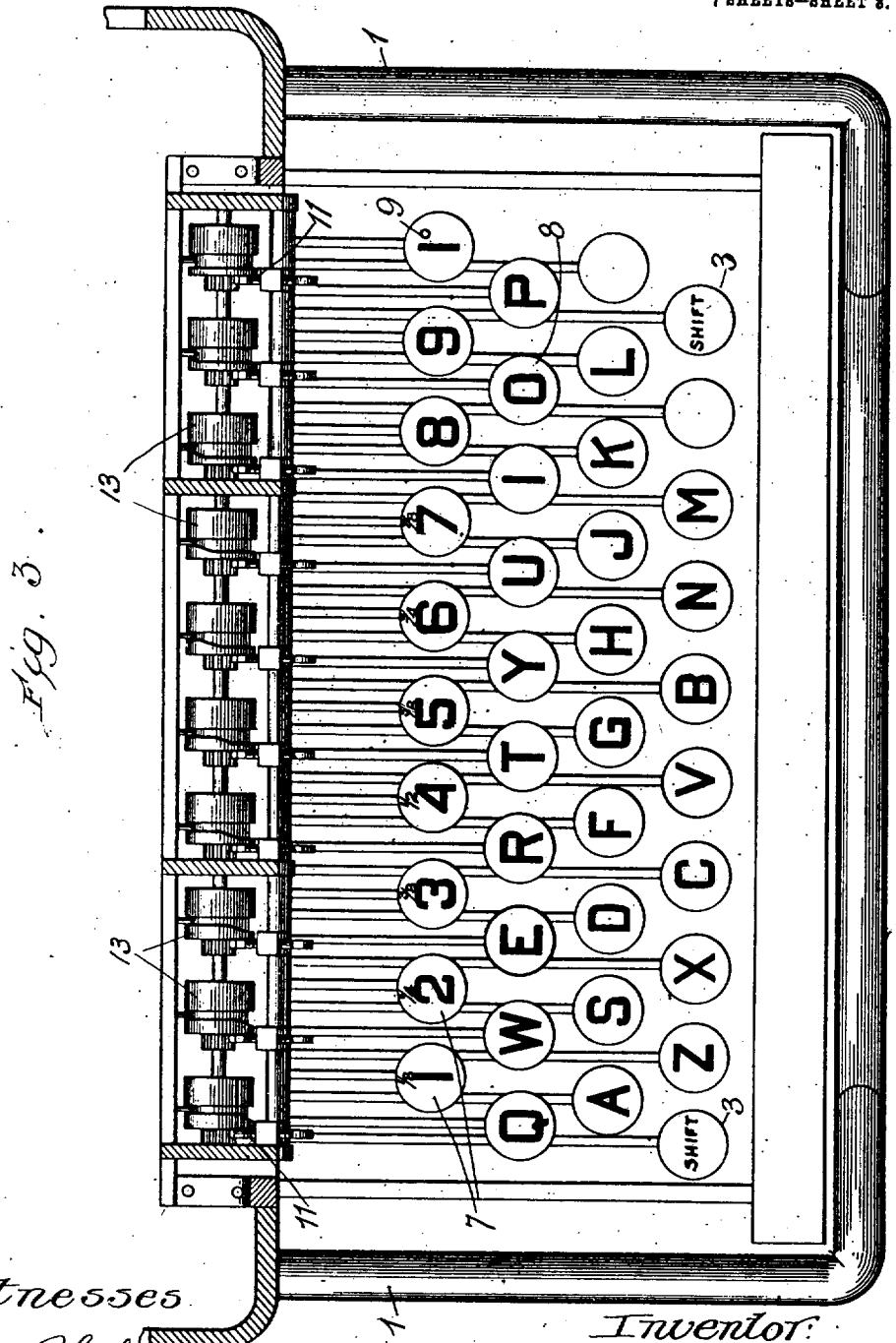

I obtain my objects by the mechanism illustrated in the accompanying drawings in which;

Figure 1 is a general front view of a typewriter and attachment embodying my invention. Fig. 2 is a vertical sectional view of the typewriter and attachment taken on the broken line 2—2, Fig. 1, looking in the direction of the arrows. Fig. 3 is a plan view of the typewriter keyboard showing the special figure keys, and also showing a portion of the preferred operating means. The figure is partly in section on line 3—3 Fig. 2. Fig. 4 is a front view of a totalizing mechanism adapted to calculate pounds, shillings and pence. Figs. 5 and 6 are transverse sectional views of the totalizing mechanism taken on line 5—5, Fig. 4. In Fig. 5, the carrying pinions are shown disengaged from the carrying wheels, and in Fig. 6 in engagement therewith. Figs. 7 and 8 are transverse sectional views of the totalizing mechanism taken on line 7—7 Fig. 4. The figures respectively show the carrying pinions out of engagement and in engagement with the carrying wheels. Fig. 9 is a face view of the receiving wheel which acts upon the pence figure wheel. Fig. 10 is a face view illustrating the relative positions of the carrying wheels and pinions. Fig. 11 is a face view and Figs. 12 and 13 are views of the two sides of a carrying wheel adapted to carry at every ten. Fig. 14 is a face view and Figs. 15 and 16 are views of the two sides of a carrying wheel adapted to carry at every two. This wheel is operated by the special key used in calculating the shillings, and serves to operate the higher one of the two figure wheels which show the shillings. Figs. 17 and 18 are face and side views respectively of the carrying wheel adapted to carry at every twelve. This wheel serves to carry from the pence to the lower one of the two figure wheels which show the shillings. Fig. 19 is a side view illustrating the relationship between a carrying wheel and its carrying pinion. Figs. 20 and 21 are side and face views respectively of a carrying pinion holder or frame of the regular type. Figs. 22 and 23 are side and face views respectively of a special type of holder which in the present instance constitutes a locking piece to act upon the two pence carrying wheels. Fig. 24 is a face view of a carrying pinion drawn to an enlarged scale. Figs. 25 and 26 are face and side views respectively of the "pence" figure wheel and Fig. 27 shows its relationship to the receiving wheels which drive it. This pence wheel here shown consists of two disks which rotate as a single piece, while the receiving wheel is triple, the three parts rotating as a single piece. Figs. 28 and 29 are face and side views respectively of the higher one of the two "shillings" figure wheels. Fig. 30 is a front view of bar which controls the holders or rocking frame wherein the carrying pinions are mounted. Fig. 31 is a front view of a totalizing mechanism adapted to calculate integers and fractions by eighths. Figs. 32 and 33 are face and side views respectively of the eighths figure wheel, the latter view showing that it has eight gear teeth. Fig. 34 is a side view of the eighths carrying wheel, showing that the same has sixteen gear teeth. Fig. 35 is a top or face view of one of the type pieces showing the manner in which it bears an integer and the corresponding fraction.

Similar numerals refer to similar parts throughout the several views.

In carrying out my invention I have employed a well known form of typewriter in which there is a stationary frame 1, which supports a laterally shiftable traveling carriage 2 which has a step by step escapement when any one of the keys is depressed. In this class of typewriter, of which the Remington, Manhattan, Densmore, Fox and Oliver are well known examples, the carriage not only travels laterally but shifts forward and backward transversely to the line of travel when one of the shift keys 3 is depressed. In the present instance the shift key causes the front to rear shifting of the carriage through the agency of the bell crank levers $3^a$ and $3^b$ which are pivoted on the stationary pin $3^c$, as shown in Fig. 2. The lever $3^a$ is connected to the shift key by rod $3^d$ and lever $3^b$ is provided with a rod $3^e$ which acts upon the carriage to produce the front to rear movement thereof. The type pieces 4 are operated by means of the linkwork 5 in the usual manner and the purpose of the front and rear shifting of the carriage is to determine which of the two types upon the acting piece is to make its impression upon the paper carried upon the platen or roller 6 in carriage 2. The typewriter is provided with figure keys 7 numbered from one to nine both inclusive and is also provided with the figure keys 8 which prints 0 but has no rotative effect upon the wheels of the totalizer. In the present machine for calculating pounds, shillings and pence a special key 9 is also provided and will be hereinafter more fully described. By preference the figure keys 7 bear in addition to their main digits the fractions ⅛, ¼, ⅜ etc., located respectively on the 1, 2 3 etc., figure keys, ending with ⅞ upon the 7 figure key as shown in Fig. 3. These extra fractional figures are for use in connection with the calculating of the fractional series of eighths and the parts are so arranged that the main digits will be printed upon the paper unless a shift key be depressed, in which case the corresponding fraction will be printed. A type piece adapted to operate in this manner is shown in Fig. 35.

Figure key indicated by the reference numeral 9 has preferably a "1" marked thereon although the mark might be "10" or possibly some special symbol. The purpose of this last key however is to print a "1" and to add a "ten" for calculating in pence, inches, shillings or other ultra decimal systems of notation as will hereinafter more fully appear.

For convenience the different systems of notation are referred to as decimal, fractional and ultra decimal. The decimal system of course carries at every ten, the fractional system carries at a number under ten and the ultra decimal system carries at a number greater than ten.

Each figure key is adapted to impart a rotary movement to the setting wheel 10, the amount of rotation depending upon the value of the particular figure key which is acting at the time. Different mechanisms might be employed for transmitting proper movement from the figure keys to the setting wheel, but the mechanism which I prefer and the one here illustrated, is fully shown and described in my aforesaid patent No. 782,554. Each of the figure keys from 1 to 9 both inclusive, and also the extra figure key marked 9 are connected to their respective digit sectors 11 preferably by means of the links 12 as shown in Fig. 2. These digit sectors are adapted to oscillate upon a fixed pivot and produce a forward and rearward rotation of their respective digit pieces 13 and also produce a lateral shifting of said digit pieces. Each digit piece has a number of gear teeth thereon, the number of teeth upon each digit piece determining the value of such digit piece. By means of their gear teeth the digit pieces are adapted to rotate the digit pinion bar 14 an amount corresponding to the value of the acting figure key, thus the key will rotate the bar 14 one tooth space, the "2" key will rotate it two tooth spaces, etc. Special key 9 will rotate bar 14 ten tooth spaces, its digit piece having ten acting teeth notwithstanding the fact that said special key causes the printing of "1". The rotation of bar 14 is transmitted to the setting shaft 15 by means of suitable gearing inclosed within the casing 16 this gearing being fully described in the aforesaid patent, No. 782,554. The motion of the setting shaft is transmitted to setting wheel 10 by means of the bevel gears 17 as best shown in Figs. 1 and 2. The setting wheel is stationary and rotates about a fixed axis and is adapted to gear with the receiving wheels 18 as they move past it as will hereinafter more fully appear. The machine here shown is arranged to calculate the form of bills above mentioned in which there are yards and eighths of yards to be added together, and pounds, shillings and pence to be added together. For this purpose two totalizing mechanisms are employed and these are shown in the drawings to be arranged in separate frame works. In Fig. 1 these totalizing mechanisms are marked Nos. 1 and 2, No. 1 occupying a position to the left and being adapted to calculate integers and eighths, and No. 2 occupying a position to the right and, being adapted to calculate pounds, shillings and pence. There is no reason, however, either theoretical or structural why both of these totalizing mechanisms may not be mounted in a single framework. The construction of totalizer No. 1 is specially illustrated in Figs. 31 to 34 both inclusive while the remaining figures illustrate the construction of totalizer No. 2 and also the features common to both totalizers.

Said totalizers are mounted upon a slide 19 adapted to travel upon the guide bar 20. The guide bar is arranged parallel with the direction of travel of the typewriter carriage and the motion of the carriage is transmitted to slide 19 by means of the arm 21. The totalizers, which are fastened upon slide 19, consequently travel in unison with the typewriter carriage, and in the ordinary operation of the machine the carriage travels from left to right to cause the printing to read from left to right on the paper.

Referring first to the No. 2 totalizer which is best illustrated in Figs. 4 to 29 inclusive, the framework walls 22, 22, support three shafts 23, 24 and 25. Upon shaft 23 are mounted the receiving wheels 18 above mentioned which are adapted to move across the setting wheel 10 and be engaged thereby one after the other. Said receiving wheels are preferably all alike with a single exception and in the present design are provided with thirty gear teeth. Each receiving wheel is permanently in mesh with its carrying wheel 26, the latter wheels being independently rotatable upon said shaft 24. Upon shaft 25 are the figure wheels 27 which carry numerical figures or digits upon their cylindrical surfaces. The figure wheels are independently rotatable and at the side of each one is rigidly fastened a gear wheel 28 which meshes with its respective receiving wheel 18 so that the rotation of the receiving wheel causes the rotation of the figure wheel. In order to obtain the carrying action from any one carrying wheel to the next one at the left thereof, the carrying wheels 26 are engaged in pairs by carrying pinions 29 in the manner fully set forth in Patent No. 710,772 issued to me October 7, 1902.

At different parts of the different totalizers the carrying points are different, for instance one carries at every two, another at every eight, another at every ten and another at every twelve, but the theory in all is the same and for illustration the wheels carrying at every ten will first be described, reference being had especially to the left portion of Fig. 10 and to Figs. 11 to 13 and also Figs. 19, 20, 21 and 24. As brought out in said patent No. 710,772, and as shown for example in Figs. 4 and 10 of the drawings of the present application, each carrying wheel is connected to its neighbor on the right by one carrying pinion and to its neighbor on the left by another carrying pinion. Each carrying wheel consists of three sections which are preferably integral with each other. The section on the right consists of a complete toothed gear wheel, which in the present instance has twenty teeth. The sections on the left and middle are two disk sectors having an angular extent exceeding 180° by one tooth space. Said sectors are on diametrically opposite sides of the wheel axis and consequently there are formed two overlappings which constitute carrying-teeth. There are thus two carrying teeth on a carrying wheel having twenty teeth and hence the wheel will carry for every ten. By analogy it is obvious that if there were ten evenly distributed carrying teeth the wheel would carry at every two and this is actually the case with the higher one of the two "shillings" carrying wheels shown in Figs. 4, 14, 15 and 16 and hereinafter again referred to. The carrying pinions 29 are also formed in three sections as most clearly shown in Fig. 24. The section at the left is a complete gear wheel and preferably has eight teeth. They are adapted to mesh with the completely toothed right section of the carrying wheel located next to the left as best shown in Fig. 10. The middle and right sections of a carrying pinion are eight toothed gear wheels mutilated by having each alternate tooth removed. The teeth of the mutilated sections alternate with each other, and the parts are so arranged that when in engagement the middle section of a pinion will be adjacent to the left section of the next carrying wheel to the right while the right section of the pinion will be adjacent to the middle section thereof. As a result, the rotation of the right carrying wheel will cause the pinion to rotate one tooth space once during every half rotation of said wheel and will in the meantime hold the pinion locked, and the step by step rotation of the pinion will be transmitted to the left carrying wheel one tooth space at a time. It will be noted that this mechanism is reversible, that is, the rotation may be in either direction, and consequently the totalizer is capable of performing both addition and subtraction. It will also be noted that the carrying pinions perform two functions, to wit, to carry and meantime to lock the carrying wheels located at their left. They may therefore be regarded as locking devices as well as devices for carrying.

It is clear that when the carrying pinions are in engagement with their carrying wheels each carrying wheel is prevented from rotating because the pinion connecting it to the carrying wheel to the right is itself locked upon said right carrying wheel, which is a great advantage in a totalizer or counting mechanism. But it is evident that a carrying wheel must be free to rotate during the time it is in gear with the setting wheel 10 and consequently the carrying pinions are made movable so that they may be automatically thrown into and out of operative connection with the carrying wheels at the proper time. In the present design this is accomplished by mounting said carrying pinions each in an independent holder or rocking frame 30, best shown in Figs. 5 to 8 and in Figs. 20 and 21. For convenience in construction these holders are alternately arranged in two groups on opposite sides of the carrying wheels. These holders are pivoted upon rods 31 fastened in the side walls which constitute part of the framework 22 of the totalizers. The pinion holders are rocked or swung about their pivots by means of the stationary controlling bar 32 which is fastened to the typewriter framework 1, as shown in Figs. 1 and 2. The position of a pinion holder depends upon the cross section of the bar at the particular point where the holder is momentarily located as it travels lengthwise of said bar. The swinging movement of a holder brings its pinion into and out of engagement with the carrying wheels, and the parts are so constructed that a carrying pinion will always engage its carrying wheels except when the corresponding receiving wheel 18 is in engagement with the setting wheel. Thus when the setting wheel is rotated, the engaged receiving wheel is rotated, and so also are the engaged figure wheel and carrying wheel, and the carrying pinion which connects said setting wheel to the higher carrying wheel is in operative position but the next pinion to the right is back out of operative position and thus allows such rotation to take place. Said first pinion to the right however is the only one in retracted position, the others being in engagement with their carrying wheels to hold the same locked. The particular structure whereby this effect is produced is best shown in Figs. 2, 5, 6, 7, 8, 20 and 30. The pinion holders 30 are each provided with two projections or toes 30$^a$ and 30$^b$ which make contact with opposite sides of the controlling bar 32 above mentioned. At the point opposite to the setting wheel said bar has a cam 32$^a$ on one side and a notch 32$^b$ on the opposite side. Said cam is adapted to project the toe 30$^a$, while the notch receives the toe 30$^b$ and thereby permits the cam action to take place. The result of the cam action is to move the carrying pinion away from its carrying wheels. The ends of the notches are properly beveled so as to produce a smooth action as the holders slide along the bar. At all other points along the controlling bar, the cross section is such as to contact the toes 30$^b$ and thereby hold the carrying pinions in engagement with their carrying wheels.

The general principle of the above described carrying mechanism is common to the entire totalizer but special provisions are required for the production of a practical and complete totalizer for calculating pounds, shillings, and pence and these special provisions will now be described.

*Pounds, shillings, and pence.*—It is, of course, desirable and in a certain sense necessary that the receiving wheels be all of a size or practically so, and the same is true of the figure wheels. But while pounds are counted upon a decimal system, shillings and pence are not, there being twelve pence in a shilling and twenty shillings in a pound; and moreover while single figures are sufficient to express the pounds on the pounds figure wheels, it requires two figures to express the higher numbers of the pence and shillings series. I overcome this difficulty by making the pence figure wheel 27$^a$, shown separately in Figs. 25 and 26, double, although it constitutes a single piece, and dividing the peripheral surface into twelve spaces and fastening a gear 28$^a$ on the side, said gear having twelve teeth instead of ten as in the case with the pounds figure wheels which carry at every ten. The shillings I arrange to show on two figure wheels, which are independently rotatable and so constructed that the lower carries to the higher at every ten and the higher carries to the lowest pounds wheel at every two, in the manner hereinafter more fully described.

Reverting again to the pence wheels and carrying mechanism, the special receiving wheel 18$^a$ which in its preferred form is shown separately in Fig. 9, is loose upon shaft 23 and consists of three toothed gears adapted to rotate as a single piece. The middle and right gear are adapted to mesh with setting wheel 10 as they pass over it, but the gear to the left is slightly smaller. It never meshes with said setting wheel but remains in mesh with the twelve toothed gear 28$^a$ on the pence figure wheel 27$^a$ as best shown in Fig. 27. For convenience in construction and symmetry of design the pence figure wheel is bifurcated or recessed in the middle so as to afford a space for the middle one of the three gears of the pence receiving wheel, thereby enabling the parts to be arranged compactly. On the right portion of the pence wheel there is a series of figures running from 0 to 9 and then a "0" to be taken in connection with a "1" on the left portion, to read "10", and then a "1" to be taken in connection with a "1" on the left portion to read "11". This completes the series, the next figure being the "0" at the commencement thereof.

The carrying wheel 26$^a$ shown separately in Figs. 17 and 18 is similar to carrying wheel 26 shown in Figs. 11, 12 and 13 but has twenty four teeth in its complete gear portion and two carrying teeth, thus causing it to carry at every twelve as before mentioned. The carrying pinion 29 which engages the left portion of said pence carrying wheel 26$^a$ is the same as all the other carrying pinions, but that particular piece which would correspond to a carrying pinion to the right of the pence carrying wheel is not a pinion, in the present machine at least, but is a locking piece or dog which is fixed on a special holder 30$^c$ (see Figs. 22 and 23) and serves to hold said pence carrying wheel locked at all times except when in direct gear connection with the setting wheel 10. It has been pointed out hereinabove and also in my said Patent No. 782,554, that the locking of any one carrying wheel locks all the higher ones, and by thus keeping the pence carrying wheel, which is the lowest one in the machine here illustrated, locked, the whole totalizer becomes locked.

The reason why a special form of holder is required for the pence carrying wheel is that the locking point 30$^d$ on said holder must be disengaged from said pence carrying wheel at two printing points, for it must be borne in mind that it takes two figures to represent "10" pence or "11" pence and in my machine which does away with special type for 10 and 11, two keys must be struck. After the first key has been struck, the carriage and totalizer of course travel one step or type space to the left for printing the second figure, and it is obvious that the pence figure wheel and its driving receiving wheel must be free to rotate at this time. Consequently the special holder 30$^c$ and locking bar 32 are so constructed as to withhold the locking point 30$^d$ during the time of engagement of the setting wheel 10 with both the middle and right gears of the pence receiving wheel 18$^a$. In the present design this action is produced by making the toe 30$^e$ of the holder 30$^c$ broad enough to remain in engagement with the cam 32$^a$ of bar 32 during two positions of the totalizer and carriage, that is, during the printing of the two digits. Bar 32 has a notch 32$^c$ for receiving said special holder while said cam is acting on said holder, and in order that said locking point may be out of engagement during the action of both of the receiving wheels 18$^a$, the notch 32$^c$ is extended as best shown in Fig. 30. As is the case with the notch 32$^b$ above mentioned the ends of the notch 32$^c$ are beveled so as to produce a smooth action of the special holder 30$^c$ and in fact constitute cams for coöperating with cam 32$^a$. Thus cams 32$^a$ and 32$^c$ constitute a pair for acting upon the special holder 30$^c$ and the cams 32$^a$ and 32$^b$ constitute another pair for operating upon the regular holders 30. It is obvious that the actions of two different pairs are different and therefore must act independently of each other. I have accomplished this in an advantageous manner by making the toe 30$^e$ short and the notch 32$^c$ narrow so as to occupy only the nigh portion of the controlling bar and by making the toes 30$^b$ on the regular holders long, and placing the notch 32$^b$ only on the far portion of said bar. The toes 30$^b$ thus bridge over the narrow notch 32$^c$ and are unaffected thereby while the short toe 30$^e$ does not extend as far as notch 32$^b$ and is consequently unaffected thereby. These relationships are best illustrated in Figs. 20 and 22 taken in connection with Fig. 30.

Having thus described the construction of the pence figure wheels and actuating mechanism thereof I will next describe the shillings figure wheels and their actuating devices. The shillings are shown on two figure wheels $27^b$ and $27^c$ best shown in Fig. 4, the wheel $27^b$ being shown separately in Figs. 28 and 29. The lower shillings wheel $27^b$ which occupies a position to the right has a single series of figures 0 to 9 inclusive and has a ten toothed gear wheel 28 on the side thereof which in all respects like the pounds figure wheel above described. It is operated directly from the setting wheel 10 through the agency of its respective receiving wheel 18, and also in carrying, by the particular carrying pinion operated by the pence carrying wheel $26^a$, the parts being so arranged that said lower shillings figure wheel will be rotated one figure for each complete revolution of the pence wheel $27^a$. The higher shillings figure wheel $27^c$ which is located next to the left of wheel $27^b$ is of a special type, having marked thereon a set of "1's" which are not located close together but are separated peripherally by a single figure space as shown in Figs. 4 and 28. If desired a "0" might be marked between each alternate "1" but this is unnecessary and merely a matter of choice. The purpose of this higher shillings figure wheel is to exhibit the higher digit of any number of shillings from ten to nineteen.

It would be theoretically possible of course to make a machine in which a single shillings wheel were employed on which were marked a whole series of shillings from "0" to nineteen; but this would necessitate the use either of a wheel twice the size of the pounds wheels or one in which the figure spaces were reduced by one half; and this construction by which two figure wheels of the regular size are caused to perform the function of a single shillings wheel is one of the features of my invention. Again referring to the actual construction of the higher shillings wheel $27^c$, it carries on the side a ten toothed gear 28 in the same manner as the regular figure wheel, this gear being adapted to remain in mesh with its respective receiving wheel 18. The receiving wheel which operates it, is also operated by a carrying wheel 26 of the regular type adapted to carry at every ten, but the receiving wheel which operates the lowest pounds figure wheel is operated by a special carrying wheel $26^b$ shown separately in Figs. 14 to 16. Looking at the face of the wheel, Fig. 14, said carrying wheel $26^b$ has on the right a twenty toothed gear adapted to mesh with the carrying pinion connected to the higher shillings wheel. On its left portion however instead of having two overlapping carrying teeth, as is the case with the regular carrying wheels, it has ten overlapping carrying teeth which thus cause it to carry at every two or in other words every time one of the "1's" on the figure wheel $27^c$ is passed. Thus the lowest pounds figure wheel is moved one figure space by its carrying pinion (operated by wheel $26^b$) once for every second single movement of the higher shillings figure wheel; obviously therefore the lowest pounds wheel is rotated one figure space for every second complete rotation of the lower shillings wheel or in other words once for every twenty shillings. The lowest pounds wheel carries to the next higher one once in every ten, and all of the pounds wheels operate similarly, which is according to the regular decimal system.

To sum up the operation of the pounds, shillings, and pence totalizer, the pence figure wheel has twelve figure spaces thereon and rotates one complete revolution before carrying to the lower one of the two shillings wheels. The pence wheel constitutes a single piece but there are two independently rotatable shillings wheels the lower one exhibiting what may be termed the "units" shillings and the higher one what may be termed the "tens" shillings, the units wheel carrying at every complete rotation while the tens shillings wheel carries at every second figure space.

In connection with the operation of the shillings and pence wheels, it is desired to again mention the fact that no extra figure keys are required upon the typewriter, with the exception of the one marked with the reference numeral 9 which is employed to print the figure corresponding to the higher one of the two digits in the pence columns. This higher digit, which occupies a position to the left in the pence columns, may be termed the "tens" pence column and the lower one at the right, may be termed the "units" pence column. Suppose it is desired to set down on the paper 17 shillings and 11 pence. They will appear thus on the printed page, 17 11. To write this number, first the regular "1" figure key will be struck then the "7", then the typewriter spacing bar to give a space between the columns, then the special key marked with the reference numeral 9; then the regular "1" key. The action of the keys which cause the printing of the shillings will be the same as for the pounds figure wheels and as set forth in my prior patent No. 782,554; but for the higher pence digit the special key 9 will be struck, which prints "1" but causes the pence figure wheel to rotate ten figure spaces. And now to complete the printing of the pence, the regular "1" figure key is struck which causes the pence figure wheel to rotate one more tooth space. The fact that both the regular "1" key and the special key both act upon the pence figure wheel is due to the fact that the pence receiving wheel $18^a$ has two gear portions adapted to be operated by the setting wheel 10. It will thus be seen that although there are twelve figure spaces on the pence wheel my machine is able to both properly print and properly rotate the pence figure wheel for anyone of the twelve positions by the aid of a single key in addition to the regular figure keys of the typewriter. To put the matter briefly it might be said that the special key mechanism is arranged to print a "1" but add ten.

*Integers and vulgar fractions.*—Having now described totalizer No. 2 which is adapted to compute pounds, shillings, and pence, I will now refer to totalizer No. 1 which is adapted to compute integers and fractions. As here constructed totalizer No. 1 is adapted to compute integers and eighths, although it will be obvious that the machine could be designed to compute other fractions without departing from the spirit of the invention. Figs. 31 to 34 both inclusive especially illustrate totalizer No. 1, and, the only difference between it and the pounds portion of totalizer No. 2 lies in the construction of figure wheel $27^d$ and the carrying wheel $26^c$. Figure wheel $27^d$ has eight figure spaces thereon progressing by eighths, and at the side of this wheel is fastened the gear $28^b$ which has eight teeth instead of ten as in the integer portion of the mechanism. Said gear $28^b$ remains in mesh with its respective receiving wheel, the number of teeth on the figure wheel gear corresponding to the number of figure spaces on its figure wheel. The receiving wheel which operates the eighths figure wheel meshes with a special carrying wheel $26^c$ shown separately in Fig. 34. This carrying wheel is similar to the ones previously described except that it has in its complete gear portion sixteen teeth. It has, in common with the others, two carrying teeth located on diametrically opposite sides and consequently said wheel carries twice for every complete revolution or once for every eight figure spaces. Therefore a complete revolution of the fraction 1 wheel causes the lowest integer wheel to rotate one tooth space. The receiving wheels of totalizer No. 2 are operated from setting wheel 10 and consequently no special figure keys are required to impart the proper amount of rotation to the fractional wheel $27^d$; but to print a fraction on the paper obviously requires a different type from that required to print an integer, and in order that the figure keys may print fractions when acting on the fraction figure wheel and integers when acting on the integer figure wheels, I have provided each of the first seven figure keys with two kinds of type as shown separately in Fig. 35. As there shown, a type piece 4 which is connected to and operated by the "3" figure key bears both a "3" and a "⅜". When this key is struck the setting wheel will rotate three spaces, and if the integer is to be printed the typewriter carriage 2 will be left in normal position as illustrated in full lines Fig. 2, but if a fraction is to be printed the carriage will be shifted by means of one of the shift keys 3 so as to bring the platen 6, opposite to the fractional type ⅜. Thus this machine is capable of calculating different denominations by the use of the same figure keys and is capable of simultaneously printing the proper character, the change from printing an integer to a fraction being accomplished by merely depressing a shift key.

In the form of typewriter here shown, the keys remain stationary and the platen or paper carriage shifts, which produces the lateral movement of the totalizer past the setting wheel. But there are standard and well known typewriters in which the figure keys shift while the paper remains stationary and in fact this would be the case if the machine here shown were turned bodily upside down and caused to rest upon the carriage. The spirit of my invention therefore is present in any machine in which there is a relative shifting of the totalizer and setting wheel if such machine otherwise responds to any of the following claims.

What I claim as new and desire to secure by Letters Patent, is;

1. In a calculating machine the combination of a set of figure keys, a totalizer adapted to be operated in each of its columnar or ordinal places by each key of the set except the zero key, said totalizer being adapted to calculate in both integers and vulgar fractions having a denominator other than 10.

2. In a calculating machine the combination of a totalizer having carrying wheels adapted to calculate in different systems of notation, both decimal and non decimal, and a single set of keys including the ordinary 0 to 9 keys for operating said carrying wheels, at least one of said keys being operable upon carrying wheels of more than one kind, decimal and non decimal.

3. In a calculating machine the combination of a totalizer adapted to calculate integers and fractions having a denominator different from 10; and actuating mechanism for said totalizer, including a set of figure keys some of which are operable upon both the integer portion and the fractional portion of said totalizer.

4. In combination, a key operated typewriter having numerical figure keys; a totalizer adapted to calculate numbers of different denominations, decimal and non decimal; and a setting wheel for operating said totalizer in all denominations thereof, all of the numerical typewriter keys being operable upon the setting wheel, whereby a given numerical key is able to not only print its character but also to add its value in any one of the different denominations.

5. In combination, a key operated typewriter having numerical figure keys; a totalizer adapted to calculate numbers of different denominations, decimal and non decimal; and setting means for operating said totalizer in all denominations thereof; all of the numerical typewriter keys being operable upon the setting means whereby a given numerical key is able not only to print its character but also to add its value in any one of the different denominations.

6. In a calculating machine the combination of a totalizer adapted to calculate numbers of different denominations, both decimal and non decimal; a setting member operable upon the entire totalizing mechanism, and a set of figure keys each one of which is operable upon said setting member.

7. In a calculating machine the combination of a totalizer having wheels of more than one denomination both decimal and non decimal; a setting wheel adapted to operate the entire totalizer, said setting wheel and totalizer being shiftable relatively to each other; shifting mechanism for shifting the shiftable part of the machine; and a set of figure keys including a zero key, all of said keys being operative upon said shifting mechanism and all the keys except the zero key being operative upon said setting wheel.

8. In a calculating machine the combination of a laterally shiftable totalizing mechanism having wheels of more than one denomination both decimal and non decimal; a setting wheel adapted to operate the entire totalizing mechanism as the same is shifted past it; and a set of figure keys including a zero key, all of said keys being operable upon said totalizing mechanism to shift it and all of the keys except the zero key being operable upon said setting wheel.

9. In a calculating machine the combination of a totalizer adapted to calculate integers and vulgar fractions whose denominator is different from 10; and actuating mechanism for said totalizer, said actuating mechanism including a set of figure keys in which there are digit keys and a zero key, all of the digit keys being operable upon the integer portion of the totalizer and some of said keys being operable upon the fractional portion of said totalizer.

10. In a calculating machine, a totalizer including gear wheels having different numbers of teeth in the different ordinal places, some of said wheels having teeth occurring in a multiple of 10 and some in the multiple of a number other than 10, whereby said totalizer is adapted to calculate both integers and vulgar fractions having a denominator other than 10; in combination with actuating mechanism for said totalizer, said actuating mechanism including ten figure keys, of which nine are digit keys and one is a zero key, all of the digit keys being operable upon the integer portion of the totalizer and some of said keys being operable upon the fractional portion of said totalizer.

11. In a calculating machine, a totalizer having gear wheels provided with different numbers of teeth in different ordinal places so that the totalizer may calculate integers and eighths; in combination with actuating mechanism therefor, said actuating mechanism containing figure keys all of which are operable upon the integer portion of said totalizer and some of said keys being operable upon the fractional portion of said totalizer.

12. In a calculating machine, a totalizer including figure wheels of more than one denomination and driving gear wheels for driving said figure wheels, said driving wheels having different numbers of teeth in the different denominational places for driving said figure wheels, some of said driving wheels having their teeth occurring in a multiple of 10, and some in a multiple of a number other than 10, whereby said totalizer may compute in integers and in vulgar fractions whose denominator is different from 10; in combination with a setting wheel for actuating all denominations of said driving gear wheels, means shiftable relatively to one of said parts (totalizer and setting wheel) for bringing them into connections with each other so that the setting wheel may actuate the totalizer, and a set of figure keys including a zero key, all of said keys being adapted to shift said shiftable means and all of said keys except the zero key being adapted to operate the setting wheel.

13. In a recording calculating machine, the combination of a totalizing mechanism having wheels of more than one denomination, or system of numerical notation, decimal and non decimal, a setting wheel for actuating all denominations of said totalizing mechanism, means shiftable relatively to one of said parts for bringing them into connection with each other so that the setting wheel may actuate the totalizing mechanism, a set of letter keys for printing words, and a set of numerical figure keys including a zero key, all of said numerical keys being adapted to shift said shiftable means, and all of said figure keys except the zero key being adapted to operate the setting wheel.

14. In a recording calculating machine, the combination of a totalizing mechanism having wheels of more than one denomination, to wit, integers and vulgar fractions, having a denominator other than 10, a setting wheel for actuating all denominations of said totalizing mechanism, means shiftable relatively to one of said parts for bringing them into connection with each other so that the setting wheel may actuate the totalizing mechanism, a set of letter keys for printing words, and a set of numerical figure keys including a zero key, all of said keys being adapted to shift said shiftable means, and all of said figure keys except the zero key being adapted to operate said setting wheel.

15. In a calculating machine the combination of a setting mechanism and a totalizing mechanism one of which is shiftable relatively to the other for bringing the parts into operative relation, said totalizing mechanism including figure wheels and carrying mechanism for operating the same, some of the figure wheels having one kind of a series of figures thereon and others of said figure wheels having another kind of a series thereon and different portions of said carrying mechanism carrying at different amounts corresponding to the kinds of series marked upon the figure wheels they operate upon; and a set of figure keys including a zero key, all of said keys being adapted to shift the shiftable part of the machine, and all of the keys except the zero key being operable upon the setting mechanism.

16. In a calculating machine the combination of a setting wheel and a totalizing mechanism shiftable relatively thereto for coming into operative connection therewith, said totalizing mechanism including figure wheels and carrying mechanism for operating the same, some of the figure wheels having a series of integers thereon and others of said figure wheels having a series of vulgar fractions thereon, whose denominators are different from 10 and different portions of said carrying mechanism carrying at different amounts corresponding to the kinds of series marked upon the figure-wheels they operate upon; and a set of figure keys including a zero key, all of said keys being adapted to shift said totalizing mechanism and all of the keys except the zero key being operable upon the setting mechanism.

17. In combination, a typewriter having letter and numerical type and a paper carriage; a setting wheel adapted to be operated by all of the numerical figure keys; and a totalizer shiftable past the setting wheel in unison with and under the influence of the typewriter carriage, said totalizer containing wheels of different denominations both decimal and non decimal all of which are adapted to be operated by said setting wheel as they move past it.

18. In combination, a typewriter having letter and numerical type and a paper carriage; a setting wheel adapted to be operated by all of the numerical figure keys; and a totalizer shiftable past the setting wheel in unison with the typewriter carriage, said totalizer including figure wheels and carrying mechanism operative thereon, some of said figure wheels having a series of integers and some a series of vulgar fractions, whose denominators are different from 10 and different portions of said carrying mechanism being adapted to carry at different amounts depending upon the kind of series upon the figure wheel they operate, and the entire totalizing mechanism being adapted to be operated by said setting wheel.

19. In a recording calculating machine, a totalizing mechanism having figure wheels some of which show integers and some of which show vulgar fractions with denominators different from 10; and driving gear wheels for driving said figure wheels, a driving gear wheel for an integer figure wheel having its teeth occurring in some multiple of 10, and a driving gear wheel for a fractional figure wheel having its teeth occurring in some multiple of a number different from 10; in combination with a setting wheel for actuating the wheels of all denominations of said totalizing mechanism, a carriage adapted to travel upon the supporting framework and thereby bring the totalizing mechanism into connection with the setting wheel; a set of letter keys, and a set of numerical figure keys, all of the keys being adapted to shift the carriage, and the numerical figure keys, furthermore being adapted to operate the setting wheel.

20. In combination, a typewriter including a framework, a carriage shiftable thereon; letter keys and numerical figure keys adapted to cause the shifting of the carriage; letter and figure type operated by the respective keys; a setting wheel, and a totalizer having different parts adapted to calculate different denominations decimal and non decimal, the setting wheel being operable upon the said different parts of the totalizer whereby it produces calculation in all the denominations of the totalizer, and said numerical figure keys being all operable upon the setting wheel with the result that any given numerical figure key is capable of producing calculations in all denominations of the totalizer, said totalizer being shiftable simultaneously with the carriage to be thereby brought into operative relation with the setting wheel.

21. In a calculating machine, a totalizer embodying figure wheels of more than one denomination both decimal and non decimal and carrying pinions, and carrying wheels adapted to carry at different amounts corresponding to the denominations of the associated carrying wheels; in combination with a single set of figure keys each one of which is operable upon each one of said carrying wheels.

22. In a recording calculating machine adapted to record integers and the fractions thereof produced by dividing such integers by a common denominator, the combination of a paper carriage, a type member bearing two numerical types thereon one an integer and the other a fraction whose value is equal to said integer divided by the common denominator of the series, means for shifting one of the parts relatively to the other to enable the operator to select which of said types shall print; a totalizer, and a figure key adapted to impart a printing movement to the type member and simultaneously set up the respective amount upon the totalizer.

23. In a recording calculating machine a totalizer having integer carrying wheels and a vulgar fractional carrying wheel; integer type and fractional type; and means for actuating said carrying wheels and simultaneously printing either an integer or a fractional type; each of said integer keys being adapted to operate each of said integer carrying wheels; and controlling means whereby the operator may predetermine which of the two types shall print.

24. In a recording calculating machine a totalizer having integer carrying wheels and a vulgar fractional carrying wheel, a setting wheel operative upon all of said carrying wheels; means for printing integer type characters or fractional type characters and simultaneously actuating the setting wheel an equal amount for any integer and its corresponding fraction, and means for enabling the operator to control which of the two types shall print.

25. In a recording calculating machine adapted to calculate both integers and vulgar fractions, integer carrying wheels and a fractional carrying wheel; a digit piece operative upon said carrying wheels; and means for actuating said digit piece and simultaneously printing either an integer or the fractional type which corresponds thereto, and means for enabling the operator to select which of the two types shall print.

26. In a recording calculating machine the combination of a set of type pieces each bearing thereon two types one of which is an integer and the other is a vulgar fraction whose numerator corresponds to the integer on such type piece; a totalizer having carrying wheels; means for actuating the carrying wheels of the totalizer; figure keys for operating said actuating means, any given figure key being adapted to also operate its respective type piece; and means for selecting which of the types upon such piece shall print when the given key is depressed.

27. In an adding machine, the combination with a set of numeral-keys, of adding mechanism controlled by said keys for adding integers, and an auxiliary adding mechanism controlled by the same numeral-keys for adding vulgar fractions, whose denominator is different from 10.

28. In a calculating machine, the combination of a totalizer having means for calculating in different systems of notation, decimal and non decimal and a set of figure keys, each key of the set except the zero key being adapted to operate the totalizer in each of the columnar or ordinal places thereof.

29. In a calculating machine, the combination of a totalizer having means for calculating integers and vulgar fractions including fractions whose denominator is different from 10, and a set of figure keys, each key of the set except the zero key being adapted to operate the totalizer in each of the columnar or ordinal places thereof.

30. In an adding machine the combination of a totalizer having two kinds of figure wheels one kind showing integers and the other kind vulgar fractions having a denominator less than 10 in consequence whereof the numbers of the figures in a complete series on the fractional figure wheel is less than 10, the integer figure wheels and fractional figure wheel all having the same exterior diameter; and a set of figure keys, each key of the set except the zero key being adapted to operate the totalizer in each of the columnar or ordinal places thereof.

31. The combination of a totalizer having indicator parts representing integers and fractions, a set of figure keys each of which can operate each integer indicator and some of which can operate the fraction indicator, the fraction indicator representing fractions having a denominator different from the base of the numeral system represented by the integer.

32. In a calculating machine, a totalizer having integer carrying wheels, carrying decimally, and a fraction carrying wheel carrying non decimally, and means for operating the totalizer in the integral and fractional parts thereof, said operating means including a set of keys each one of which is adapted to operate each one of the integer carrying wheels.

33. In a recording calculating machine, a totalizer having integer carrying wheels, carrying decimally, and a fractional carrying wheel carrying non decimally, and means for operating the totalizer in the integral and fractional parts thereof, said means including a set of keys each one of which is adapted to operate one of the integral carrying wheels, and type mechanism operated by said keys for recording the calculations upon a record sheet.

34. In a calculating machine, a totalizer having integer carrying wheels, carrying decimally, and a fractional carrying wheel carrying non decimally, a setting wheel for operating the carrying wheels, and a set of figure keys for operating the setting wheel in amounts corresponding to the value of the figure keys.

35. In a recording calculating machine, a totalizer having integer carrying wheels, carrying decimally, and a fractional carrying wheel carrying non decimally, a setting wheel for operating the carrying wheels; a set of figure keys for operating the setting wheel in amounts corresponding to the value of the figures on said keys and type mechanism adapted to be operated by each figure key to print the corresponding figure on the record sheet.

In witness whereof, I have hereunto subscribed my name in the presence of two witnesses.

HYMAN ELI GOLDBERG.

Witnesses:
HOWARD M. COX,
CAROLYN RAFTERY.